(12) United States Patent
Waters

(10) Patent No.: US 8,800,869 B2
(45) Date of Patent: Aug. 12, 2014

(54) INVENTORY CONTROL USING ELECTRONIC SHELF LABEL SYSTEMS

(75) Inventor: Michael Waters, Seattle, WA (US)

(73) Assignee: Opticon Sensors Europe B.V. (NL)

( * ) Notice: Subject to any disclaimer, the term of this patent is extended or adjusted under 35 U.S.C. 154(b) by 0 days.

(21) Appl. No.: 13/478,610

(22) Filed: May 23, 2012

(65) Prior Publication Data

US 2013/0313317 A1 Nov. 28, 2013

(51) Int. Cl.
*G06F 19/00* (2011.01)

(52) U.S. Cl.
USPC .......................................................... 235/385

(58) Field of Classification Search
CPC ................................. G08G 2380/04
USPC ................................. 235/383, 385
See application file for complete search history.

(56) References Cited

U.S. PATENT DOCUMENTS

| 7,152,040 | B1 * | 12/2006 | Hawthorne et al. | 705/16 |
| 8,556,172 | B2 * | 10/2013 | Nakamura | 235/385 |
| 2003/0222139 | A1 * | 12/2003 | Stephenson et al. | 235/383 |

* cited by examiner

*Primary Examiner* — Jamara Franklin
(74) *Attorney, Agent, or Firm* — Kaplan Breyer Schwarz & Ottesen, LLP

(57) ABSTRACT

An electronic shelf label (ESL) is constructed to display a bar code, or the like, and inventory information, in addition to the typical product identification and price. A stock person carrying a handheld communicator with a bar code scanner can conveniently scan the ESL and then enter the number of items removed from or placed on the shelf. Assuming he is using a wireless communicator, the information is sent immediately to the ESL server via the ESL system, and the ESL display is then updated as well as the establishment's inventory database.

3 Claims, 3 Drawing Sheets

INVENTORY CONTROL USING ELECTRONIC SHELF LABEL SYSTEMS

BACKGROUND OF THE INVENTION

The present invention relates generally to electronic shelf label (ESL) systems of the type commonly used in supermarkets and department stores for retail display. More particularly, the invention concerns an ESL, an ESL system constructed for real time inventory control and methods for their use.

Electronic shelf labels (ESLs) find use in merchandising establishments and warehouses to display pricing and other information and to manage inventory. For example, in a supermarket, ESLs might be mounted visibly on the shelves for different items as a replacement for conventional price labeling systems, utilizing electronic LED and/or LCD displays in which the price of an item is displayed for viewing by a consumer. As item prices change, the new prices can be displayed "instantaneously". An advantage of such ESL systems is that pricing of hundreds or thousands of items throughout an environment can be managed by a server centrally rather than having paper price labels replaced or updated throughout the environment every time prices change. Additionally, other messages in addition to pricing data can be set by a central operator and displayed to a consumer.

Typically, ESLs in a system are clustered in groups, each group is serviced wirelessly by a respective base station, and the base stations are connected to an ESL server. A base station may, for example, communicate with the ESLs wirelessly. Through the use of ESL systems, a server can communicate electronically with an ESL label and update the data displayed on that label, including, but not limited to, the price. By permitting a central server and database system to perform all of the price and data maintenance and update functions for the ESL labels, a much more centrally controlled, reliable and consistent environment is created, when compared with prior conventional systems that require retail store clerks to visit the shelf and change paper labels.

Effective inventory control in a retail establishment involves far more than just keeping the product shelves stocked to meet customer demand. The stock room must contain sufficient reserve inventory to refill retail shelves during expected delays in new deliveries, but maintaining too much stock involves additional expense, unnecessary usage of space, and the risk that products may lose their freshness before they can be sold. Some products even have "sell by" dates. Another complication is that demand and restocking delay may be different for different products and may be variable over time and seasonally. When many thousands of products are involved the challenge becomes formidable. To meet the challenge, it is important to keep track of inventory in real time or near real time. Moreover, it must be done in such a reliable way that is not prone to employee errors and a convenient way so that employees would be prone to follow necessary procedures.

Broadly, it is an object of the present invention to provide an ESL, an ESL system and methods for their use that enable real time or near real time tracking of inventory in a retail environment and updating of its display.

It is another object of the present invention to provide an ESL, an ESL system and methods for their use that are reliable and convenient in use, yet are relatively inexpensive to acquire, install and maintain.

SUMMARY OF THE INVENTION

In accordance with an embodiment of the present invention, an ESL is constructed to display a bar code, or the like, and inventory information, in addition to the typical product identification and price. A stock person carrying a handheld communicator with a bar code scanner can conveniently scan the ESL and then enter the number of items removed from or placed on the shelf. Assuming he is using a wireless communicator, the information is sent immediately to the ESL server via the ESL system, and the ESL display is then updated as well as the establishment's inventory database.

It is a feature of the present invention that an ESL provided on a shelf in an establishment utilizing an ESL system includes an area in which an optical symbol is displayed, such as a barcode, which identifies the product on the shelf. As inventory is manipulated (e.g. added or removed) by an operator utilizing a communication device with an optical scanner, the operator scans the optical code on the ESL or the product and inputs information into his communicator about how inventory has been manipulated. This information is then uploaded to the system, which update an inventory display on the ESL and an inventory database for the establishment.

BRIEF DESCRIPTION OF THE DRAWINGS

The foregoing brief description and further objects, features, and advantages of the present invention will be understood more completely from the following detailed description of a presently preferred, but nonetheless illustrative, embodiment in accordance with the present invention, with reference being had to the accompanying drawings, in which.

DETAILED DESCRIPTION OF THE PREFERRED EMBODIMENT

Figure 1:
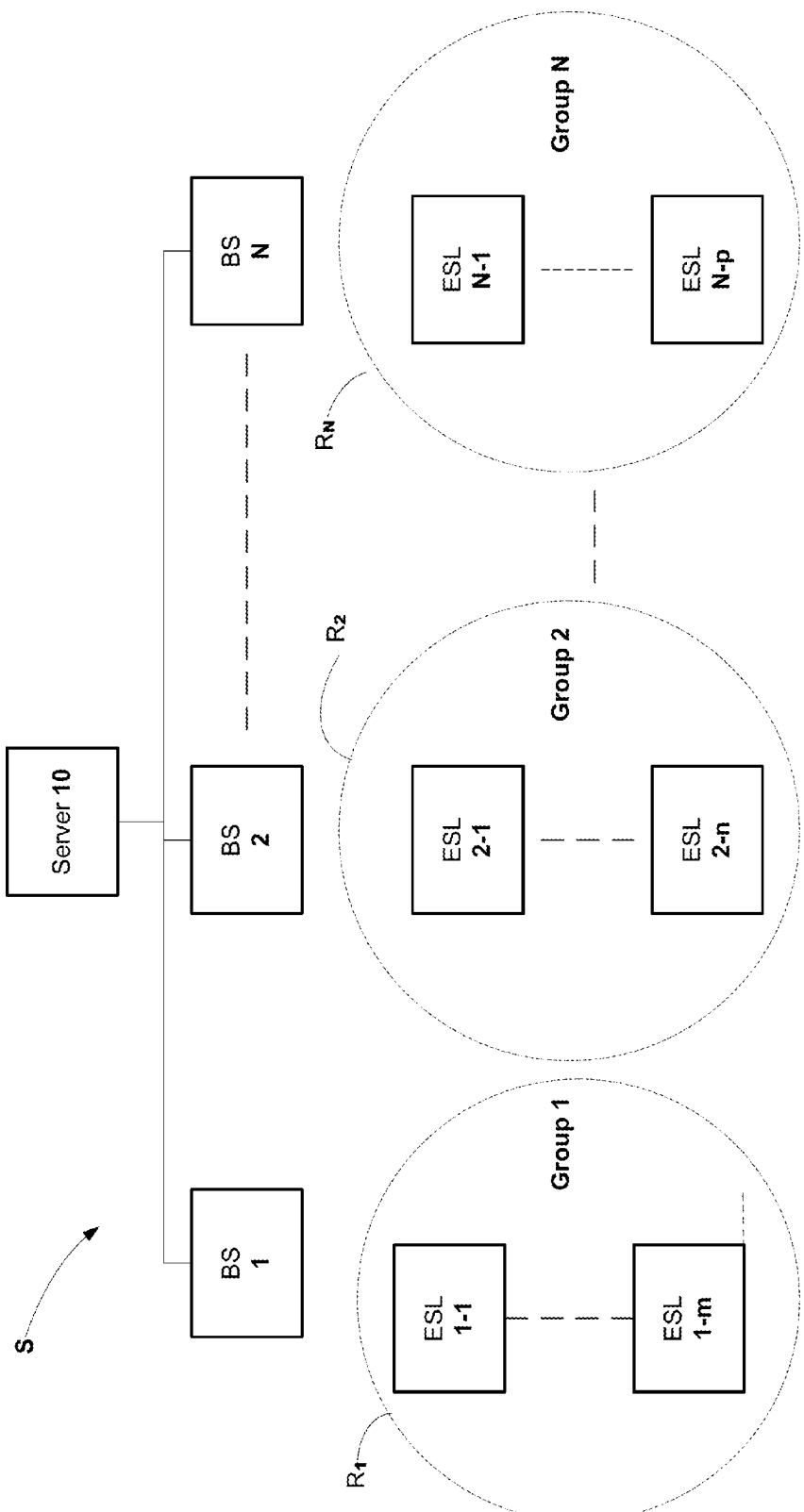
FIG. 1 is a functional block diagram of a system S embodying the present invention.

Turning now to the drawings, FIG. 1 is a functional block diagram of an ESL system S embodying the present invention. The system comprises a server 10 and base stations 1 . . . N, each associated with an ESL group (groups 1 . . . N). Each base station communicates wirelessly with a plurality of ESLs in its group. For example, base station 1 is dedicated to ESLs 1-1 through 1-m, base station 2 is dedicated to ESLs 2-1 through 2-n, and base station N is dedicated to ESLs N-1 through N-p. Typically, each ESL is associated with a respective article, which is on a shelf or in a location serviced by the ESL. The base stations have nominal, associated operating ranges $R_1 \ldots R_N$. It should be appreciated that in a small system there may be only one base station or an ESL may communicate directly with the server.

Figure 2:
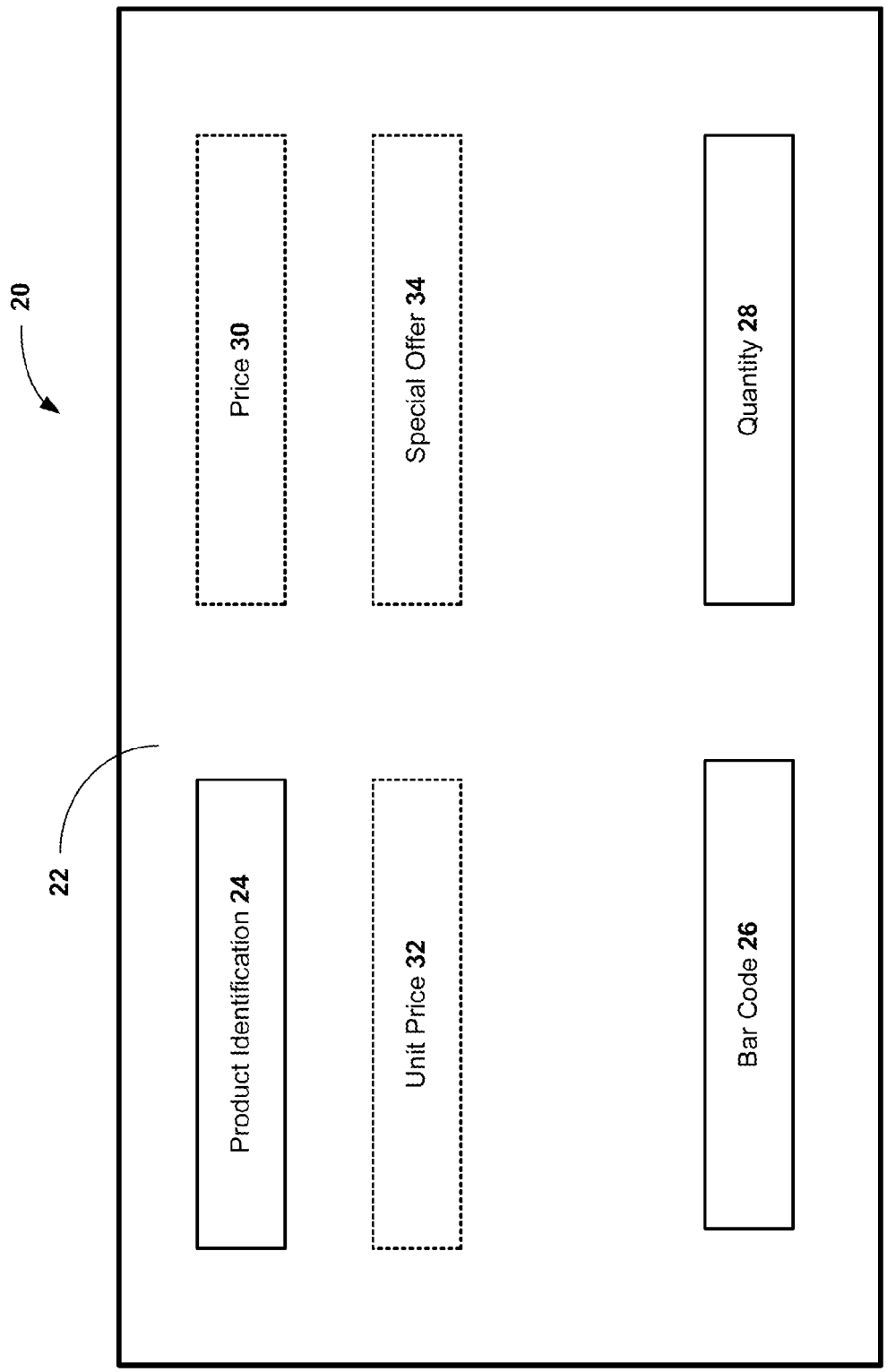
FIG. 2 is a schematic representation of a preferred embodiment 20 of an ESL in accordance with the present invention as seen by an observer.

FIG. 2 is a schematic representation of a preferred embodiment 20 of an ESL in accordance with the present invention as seen by an observer. ESL 20 has a display 22, preferably an LED, LCD or epaper display. An area 22 on the display displays an identification of the product on the shelf. Another area 24 displays a symbol, such as a bar code identifying the product on the shelf. A third area 26 displays the quantity of items on the shelf. If this is a shelf in the retail space, the display will show the number of items. On the other hand, an ESL in the stock room might show the number of cases of the product. The ESL might include additional display areas. For example, on a shelf in the retail space it would also include an area 30 showing the price of the item on the shelf, or an area 32 showing the unit price, or one or more areas 34 showing special offer information, such as quantity discounts, temporary price reductions, or price reductions for customers having loyalty cards.

In modern supermarket systems, the number of items on a shelf in the retail space can be updated in an inventory database as products are sold. As the number of items on the shelf reaches a predefined low threshold value, it is therefore possible, on an ongoing basis, to generate a restock alarms as product supply on retail shelves runs low. A display in the stock room shows the restock alarms, and a stock man headed to the retail floor can generate a to-do list. He can then go to each stock room shelf, carrying a wireless communicator with a bar code reader, and perform the process illustrated in the flowchart of FIG. 3. The process starts at block 100, and at block 102, he scans the barcode on the ESL on the shelf with his communicator. When he manipulates inventory (block 104), for example, when he removes one or more case of product from a stock room shelf, he inputs in his communicator the number of cases removed from the shelf (block 106). After this information is subsequently uploaded (block 108), the ESL server and inventory database are updated, and the ESL server updates the ESL quantity display at his location.

Figure 3:
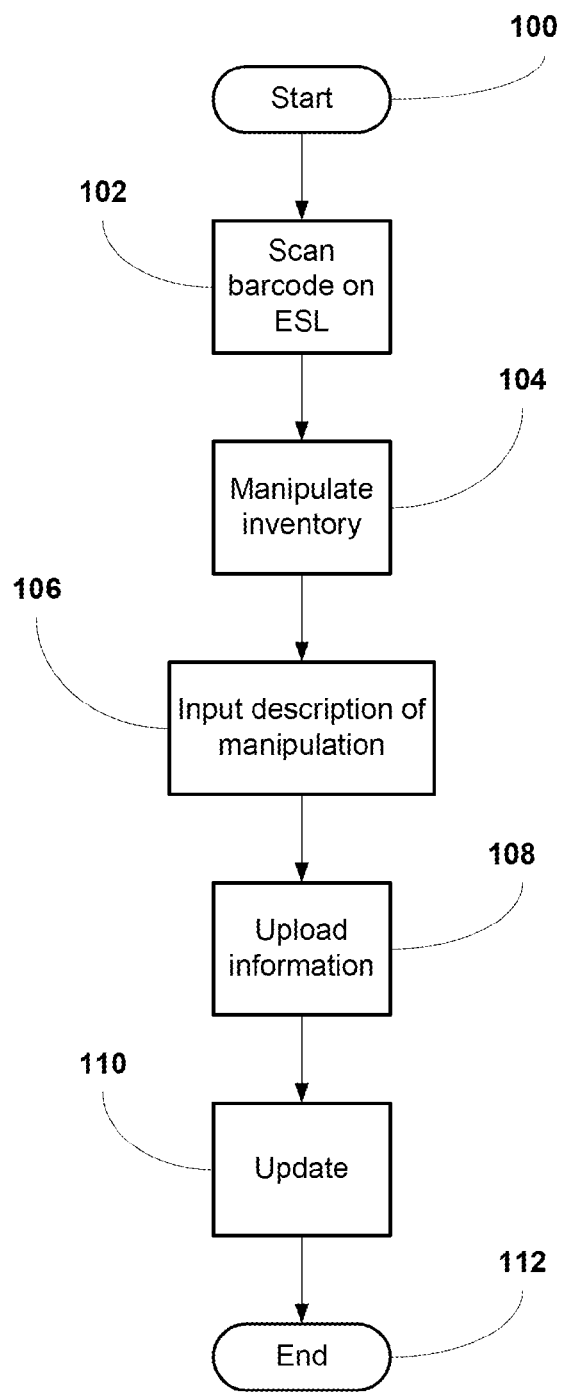
FIG. 3 is a flowchart illustrating a preferred method for using the invention in a retail establishment.

After he has all the necessary stock, the stock man heads out to the retail space. At each shelf, the process of FIG. 3 is then repeated, as the stock man scans the ESL barcode (block 102), manipulates inventory (block 104), inputs information into his communicator (block 106), and uploads the information (block 108), after which ESL display and inventory database are updated (block 110). When he refills a retail shelf he enters in his communicator the number of items he placed on the shelf. As a result, both the ESL display and inventory database are properly updated. As a practical matter, the stock man need only enter the number of cases he has emptied onto the shelf, as the system knows the number of items per case. This avoids errors that might be introduced by the stock man not knowing the number of items per case or making a mistake in arithmetic.

It will be appreciated that making use of the barcode on the ESL, the stock man is able to enter inventory information conveniently, reliably and quickly. Moreover, the ESL display and inventory database are updated in real time.

Those skilled in the art will appreciate that, in order to conserve resources or energy, an ESL need not be updated every time inventory is adjusted. This can be done periodically, or every Nth time there is an adjustment, or only when more than a certain amount of inventory is added or removed, or only when specific thresholds regarding inventory (e.g. down to 25%) are reached.

Although a preferred embodiment of the invention has been disclosed for illustrative purposes, those skilled in the art will appreciate that many additions, modifications and substitutions are possible, without departing from the disclosed invention as defined by the accompanying claims.

What is claimed:

1. A system comprising:
    a server;
    a first base station among a plurality of base stations in the system; and
    an electronic shelf label (ESL) on a shelf of a retail space that is dedicated to a product, wherein the ESL comprises:
        (i) a first portion displaying a machine-readable optical code containing information identifying the product, and
        (ii) a second portion identifying the quantity of the product on the shelf;
    wherein the ESL is configured to wirelessly communicate with the server via the first base station only;
    wherein the server is configured to update the quantity displayed by the second portion of the ESL after receiving a communication originating from a vicinity of the shelf; and
    wherein the communication is in response to a stock man inputting the number of cases that were removed from a stockroom.

2. A method for maintaining and updating information about inventory present on a shelf containing an electronic shelf label (ESL) having an electronic display with a first portion displaying a machine-readable optical code containing information identifying the product, which optical code also appears on the product, the label having a second portion identifying the quantity of the product on the shelf, the method comprising the steps of:
    reading the optical code;
    changing the quantity of inventory on the shelf;
    uploading to a remote location, information identifying the product and information about a change in quantity of inventory on the shelf;
    determining, in response to the uploaded information, whether the change in quantity of inventory reaches a predefined threshold;
    triggering, in response to the determination, a restock alarm when the change in quantity of inventory reaches the predefined threshold;
    displaying, in a stockroom, the restock alarm to inform a stock man to restock the shelf;
    updating the quantity displayed by the second portion of the ESL after receiving a communication originating from a vicinity of the shelf;
    wherein the communication is in response to the stock man inputting, via a communicator, the number of cases that were removed from the stockroom.

3. A method comprising:
    determining, by a server, whether a change in quantity of a product on a shelf has reached a predefined threshold, wherein an Electronic Shelf Label (ESL) is on the shelf and dedicated to the product, and wherein:
        (i) the ESL comprises a first portion for displaying a machine-readable optical code containing information identifying the product,
        (ii) the ESL comprises a second portion for displaying the quantity of the product on the shelf, and
        (iii) the ESL is configured to wirelessly communicate with the server via a first base station only;
    triggering, by the server, in response to the determination, a restock alarm when the change in quantity is determined to reach the predefined threshold, wherein the triggering step displays the restock alarm in a stockroom to inform a stock man to restock the shelf;
    receiving input from the stock man via a communicator, wherein the input identifies the number of cases that were removed from the stockroom in response to the restock alarm;
    updating, by the server, the quantity displayed by the second portion of the ESL, wherein updating the quantity displayed by the second portion is in response to the stock man inputting the number of cases that were removed from the stockroom.

* * * * *